(No Model.)

L. LENDRY.
PROCESS OF PRODUCING DESIGNS ON GLASS PLATES.

No. 365,527. Patented June 28, 1887.

WITNESSES:

INVENTOR:
L. Lendry
BY
ATTORNEYS.

UNITED STATES PATENT OFFICE.

LUDWIG LENDRY, OF NEW YORK, N. Y., ASSIGNOR, BY MESNE ASSIGNMENTS, TO JOSEPHINE LESTER AND NINA LENDRY, BOTH OF SAME PLACE.

PROCESS OF PRODUCING DESIGNS ON GLASS PLATES.

SPECIFICATION forming part of Letters Patent No. 365,527, dated June 28, 1887.

Application filed September 3, 1886. Serial No. 212,599. (No model.)

*To all whom it may concern:*

Be it known that I, LUDWIG LENDRY, of the city, county, and State of New York, have invented a new and Improved Process of Producing Designs on Glass Plates, of which the following is a full, clear, and exact description.

The object of my invention is to provide a new and improved process of producing designs on glass plates.

The invention consists of a process by which a glass plate is provided with a specially-prepared coating, and then the pattern of a design to be produced on the glass plate is placed on said coating, and the plate is exposed to light, after which the pattern is removed and the glass plate is washed with oil, whereby the design of the pattern appears on the plate.

The invention also consists of various details, hereinafter more fully described.

Reference is to be had to the accompanying drawings, forming a part of this specification, in which similar letters of reference indicate corresponding parts in all the figures.

Figure 1:
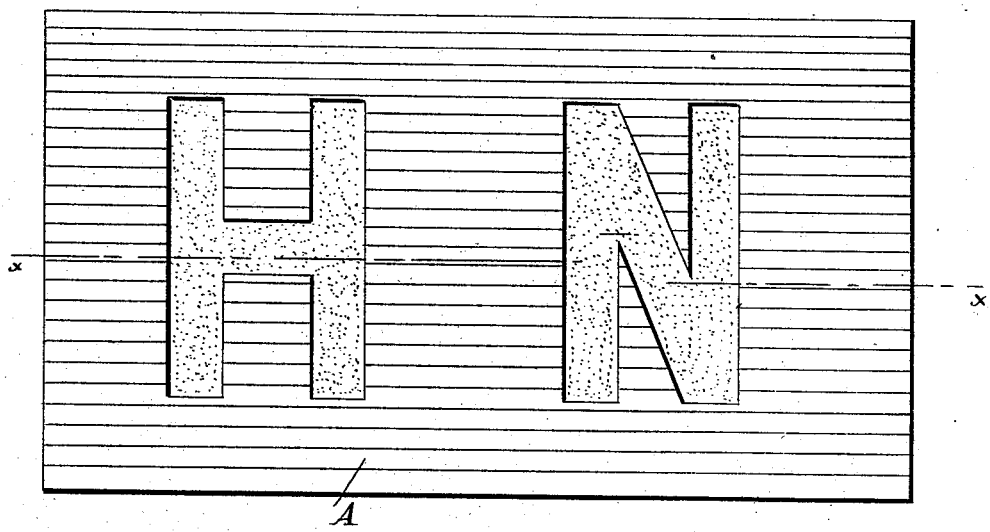
Figure 2:
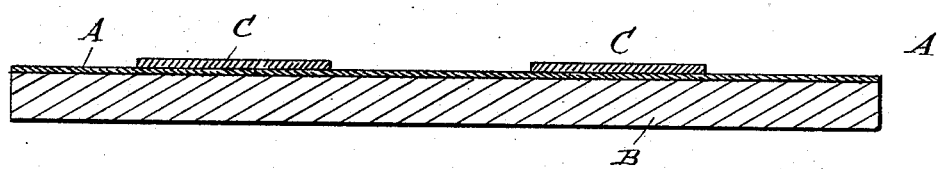
Figure 3:
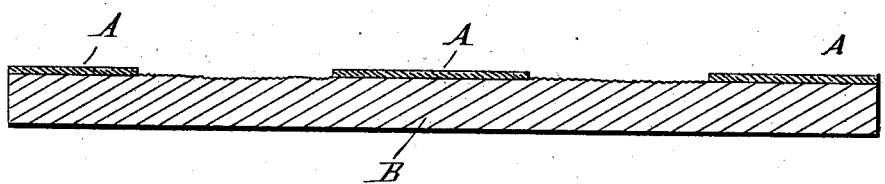

Figure 1 is a face view of a glass plate having designs produced by my improved process. Fig. 2 is a sectional elevation of a glass plate provided with the coating and showing the pattern of the design in position, and Fig. 3 is a sectional side elevation of the glass plate provided with the design.

To carry my invention into effect, I first mix the following substances in the quantity specified: Egyptian asphalt, one pound; colophony, one-fourth pound; coal-tar, one fourth pound; bicarbonate of potassium, one sixteenth pound; caoutchouc, one-sixteenth pound; ozocerite, one-eighth pound; gum-arabic in the necessary quantity. These substances are boiled until a thick but pliable mass is obtained, which is thinned by either turpentine or benzine to any desired degree, according to the work to be performed. The composition, which is kept in a dark room, is now filtered, so as to free it from lumps, &c., and is then left to cool. This substance forms the coating A, which is applied in any suitable manner and with a uniform thickness to one side of the glass plate B, to which it adheres when drying. A pattern, C, of the design to be produced on the glass plate, is then placed on the coated surface, and the entire plate is exposed to the action of light. The time during which it is exposed to the light varies according to the intensity of the rays of the light. After this the pattern is removed from the coating, and the plate is then washed with petroleum or rape-seed oil, which removes that part of the coating A which was covered by the pattern C, whereby the respective design of the pattern appears on the glass plate, as shown in Figs. 1 and 3. The coating A adheres firmly to the glass plate, and is not destroyed by washing with water, soap, or acids. The design produced on the glass plate can then be ground in any desired manner. The grinding is represented in Figs. 1 and 3.

The color of the coating is brown, and by using different-colored glass plates any desired color effect may be obtained. It will be seen that any desired design can thus be permanently printed on the glass plates.

Having thus described my invention, what I claim as new, and desire to secure by Letters Patent, is—

1. The herein-described process of producing designs on glass plates, consisting of providing a glass plate with a coating consisting, principally, of Egyptian asphalt, colophony, coal-tar, bicarbonate of potassium, caoutchouc, and ozocerite, and then placing a pattern of the design to be produced on the said plate, after which the plate and its pattern are exposed to the action of light, and the pattern is removed and the plate is washed with oil, substantially as described.

2. A new article of manufacture, consisting of a glass plate having a permanent coating consisting, principally, of Egyptian asphalt, colophony, coal-tar, bicarbonate of potassium, caoutchouc, ozocerite, and gum-arabic, and designs printed on the said glass plates with the aid of light and patterns, substantially as described.

3. The herein-described composition of matter used for producing designs on glass plates, consisting of Egyptian asphalt, coal-tar, bicarbonate of potassium, caoutchouc, gum-arabic, colophony, ozocerite, and turpentine or benzine, in the proportions specified.

LUDWIG LENDRY.

Witnesses:
 THEO. G. HOSTER,
 C. SEDGWICK.